US005778088A

United States Patent [19]

Stringa

[11] Patent Number: 5,778,088

[45] Date of Patent: Jul. 7, 1998

[54] PROCEDURE FOR PRODUCING A REFERENCE MODEL INTENDED TO BE USED FOR AUTOMATICALLY CHECKING THE PRINTING QUALITY OF AN IMAGE ON PAPER

[75] Inventor: Luigi Stringa, Trento, Italy

[73] Assignee: De La Rue Giori S.A., Switzerland

[21] Appl. No.: 610,390

[22] Filed: Mar. 4, 1996

[30] Foreign Application Priority Data

Mar. 7, 1995 [IT] Italy .............................. MI95A430 U

[51] Int. Cl.[6] .............................. G06K 9/00

[52] U.S. Cl. .............................. 382/112; 382/294

[58] Field of Search .............................. 356/408; 395/113; 382/293, 295, 112, 294; 101/481

[56] References Cited

U.S. PATENT DOCUMENTS

| | | | |
|---|---|---|---|
| 4,430,749 | 2/1984 | Schardt | 382/254 |
| 5,022,089 | 6/1991 | Wilson . | |
| 5,384,859 | 1/1995 | Bolza-Schunemann | 382/112 |
| 5,440,650 | 8/1995 | Hieda | 382/112 |

FOREIGN PATENT DOCUMENTS

| | | |
|---|---|---|
| 0 444 583 | 2/1991 | European Pat. Off. . |
| 0 527 285 | 1/1992 | European Pat. Off. . |

*Primary Examiner*—Dwayne Bost
*Assistant Examiner*—Brian L. Johnson
*Attorney, Agent, or Firm*—Kane, Dalsimer, Sullivan, Kurucz, Levy, Eisele and Richard, LLP

[57] ABSTRACT

A procedure for producing a reference model for checking the printing quality of an image composed of at least two drawings starts with printed test sheets. The sheets are aligned so that drawings printed in a first printing are in register. The images are recorded, storing the densitometric pixel values which constitute the images in memory. The minimum value obtained is associated with each pixel and a model for the first drawing is obtained. The same procedure is followed for producing a second drawing and another model. The models thus obtained are recombined in order to form the reference model of the image to be checked.

5 Claims, 1 Drawing Sheet

S3
S4
Sa3
Sa4
M2
a1
b1
a2
b2
a30
a31
a32
a33
a40
a41
a42

S1
S2
Sa1
Sa2
M1
a10
a11
a12
a13
a20
a21
a23

PROCEDURE FOR PRODUCING A REFERENCE MODEL INTENDED TO BE USED FOR AUTOMATICALLY CHECKING THE PRINTING QUALITY OF AN IMAGE ON PAPER

FIELD OF THE INVENTION

The present invention relates to a procedure for producing a reference model, by electronic means, intended to be used for automatically checking the printing quality of an image on paper, especially for paper securities, said image being composed of drawings printed in at least two separate printing phases.

PRIOR ART

When checking the printing quality on paper and especially the printing of paper securities, electronic automatic inspection means are used which comprise one or more black-and-white or color cameras to capture the images to be inspected. These images consist of matrices, usually rectangular matrices, comprising numbers which represent the quality of the light reflected, or put another way the densitometric value of the pixels into which the image is subdivided. The number of pixels relating to an image is a function of the resolution of the camera. In a monochrome (black and white) system, the image is described by a single matrix, while in polychrome systems the description consists of as many matrices as there are chromatic channels used. Normally, for descriptions of the RGB (Red, Green, Blue) type, three chromatic channels are used.

The procedures used to carry out this type of automatic check are based on the following schemes:

From a set of sheets regarded as being good, a model of acceptable printing quality is constructed. Various techniques are used to construct this model. For example, from the set of sheets regarded as being good, a kind of average image is calculated, that is to say an image which is described by a matrix in which each pixel is associated with the average value that it has in the set of test sheets.

Another procedure associates each pixel with two values, one is the minimum value which has been attained in the set of test sheets and the other is the maximum value. Thus, for each image, two matrices are used, one with the minimum value and the other with the maximum value. Of course, if an image is a polychrome image, two matrices per color channel are obtained.

When producing the images to be inspected, each pixel of the image to be inspected is compared with the pixel of the model thus obtained. If the difference exceeds a predetermined threshold value or if it lies outside the minimum-to-maximum range, the pixel is regarded as having a printing defect. The number of defective pixels determines whether or not the image will be scrapped based on the quality which it is desired to obtain and which has been determined beforehand.

When producing certain types of valuable prints, such as paper securities, bank bills, stamps, etc., the images are printed using various printing techniques, such as offset, intaglio, etc. These various types of printing we will call printing phases. Thus, in a normal printing process, the paper firstly passes through a printing system for the first phase and a first drawing is apposed, and then passes through a second printing system for the second printing phase enabling a second drawing to be apposed on the paper. In this case, apart from the problem of printing quality, there is also the problem of putting the drawings printed in the different phases into relative register. The reason for this is that deviations may exist between two images printed in this way in the case of drawings which are printed in different phases, if only because of deformation of the paper. These displacements, which may represent a few pixels, may be either in the direction of movement of the paper or in a direction perpendicular. In this case, it is no longer possible to extract a model which represents the desired printing quality by using the techniques mentioned above since very varied values may be associated with the same pixel owing to misalignment or defective registration between the printing phases.

In this case, it has been proposed to construct a model for each printing phase. To do this, sets of sheets printed only with each of the printing phases are included in the set of test sheets. Using a procedure similar to the procedure described above, a model is constructed for each printing phase. During the phase of preparing these models, the operator identifies the portions of the image which comprise only or essentially only a single printing phase.

In production, before anything, else the relative misalignments between the printing phases are measured by using the pixels identified during the preparation of the models.

Next, the models are combined, taking into account the way in which the various phases are successively printed on the sheets in order to obtain a single reference model whose disposition corresponds to the disposition of the drawings in the images to be checked. Next, each image is compared with the model thus produced. This procedure is complicated and particularly expensive for the printer, since for each production batch it is necessary to print as many sets of sheets representative of the desired printing quality as there are printing phases.

SUMMARY OF THE INVENTION

The object of the invention is to propose a procedure for the preparation of the reference model which does not have the drawbacks of the one currently employed.

The procedure according to the invention comprises the following steps:

a. a set of images (test sheets), which are completely printed by means and procedures used for long print jobs, is prepared; The arrangement of the sheets in order to put the drawings of a phase in register is made automatically and various methods may be used. One method consists in trying to put in register (align) some parts (pixels) of two consecutive drawings. The selection of the phases (technical means to be used) for printing the various drawings is done by the "author" of the image to print. The operator receives the prosecution order, and his own knowledge allows him to identify what drawing is printed according one phase. One skilled in the art is well versed in this area b. said images are arranged so that the drawings of said images printed in a first phase are in register;

c. said images are recorded and the densitometric values of pixels constituting said images are stored in memory;

d. the minimum value obtained from all the images of the set is associated with each pixel and the model of the drawing printed in said first printing phase is thus formed;

e. thereafter, the images are arranged so that the drawings printed in another printing phase are put into register and steps c. and d. are repeated, and so on, for the drawings printed in the separate printing phases; and f. the models thus obtained are recombined in order to form the reference model of the image to be checked. The combining of the models of each phase is a method already known to the art and used (i.e. Hieda).

Starting from the notion that, if the drawings of the images printed in the same printing phase are put into register, that which has been printed in this phase will keep the same position for all the images, the proposed procedure makes it possible, by obtaining the minimum pixel values from among the various values found on capturing the image, to produce the model of the drawing printed in a first printing phase, and this directly from the images completely printed as in normal-length production runs. What should change between two images, whose drawings printed in one printing phase are aligned, are the drawings printed in a subsequent printing phase.

Once all the models for each phase have been produced, it is only necessary to recombine said models, according to the images to be checked, in order to obtain the reference model, and consequently to carry out the quality check using known means. When a printed sheet has to be inspected, the reference models (previously produced) of each phase are aligned (put in register) with the corresponding drawings of the sheet to inspect. If the alignment of the models with the drawings of the sheet to inspect shows that the relative alignment of the models is out of a "predetermined range", the sheet is rejected without further processing. The "predetermined range" may be determined by the drawings of the test sheets. If the relative alignment (register) between the reference models is inside the predetermined range, the inspection of the pixel intensity is prosecuted. So after having "produced" a reference model of the printed sheet to inspect by "moving" the reference models of each phase until they are in register with the corresponding "drawings" of the printed sheet to inspect, and if the relative register between the reference model drawings is inside the predetermined range, the pixel intensity of the printed sheet is compared with the pixel intensity of the recombined reference model.

The procedure therefore makes it possible to produce a reference model from a certain number of test images printed as if in a long print run.

According to a variant of the procedure, when a pixel has the same nonzero value in more than one model, it is assigned to a single model, setting this value to zero in the other models. This makes it possible to simplify the production of models since, if a pixel has the same value in more than one model, this means that it may equally well belong to one as to another.

According to another alternative embodiment, when a pixel has nonzero but different values in more than one model, we then associate with the model which has the highest value a value corresponding to the absolute value of the difference between the two values, and the pixel value is set to zero in the model in which the value was a minimum. The two alternative and equivalent procedures for the case of pixel with non-zero (but different) values in more than one model are:

a) assign the two values (as they are) to the relevant models b) assign to the model in which the pixel has the maximum intensity the absolute difference between the two, and the minimum value to the other. In the model combination, the two intensities could be added, providing the same result.

Thus, the absolute difference is not enough to represent the pixel.

When an opaque ink is used in at least one phase of printing one of the drawings of the image at the end of the procedure, and especially the end of step e., the models of the drawings which are not printed using the opaque ink are recomposed. In the recomposed models, the pixel values of said models which are also printed with the opaque ink are excluded and, of course, the model or models of the drawing or drawings printed with the opaque ink are kept. Here opaque ink is used in the sense of an ink fully covering any previously printed color. For instance, printing a square of blue opaque ink either on a white sheet or a preprinted one will always result in a blue square image. For this reason to build models in presence of opaque inks, the printing sequence should be kept into account.

Finally, when the image is a polychrome image, the procedure is repeated as many times as the number of chromatic channels used. In synthesis, the difference lies in the fact that multiple colors of the same phase can be "perfectly" registered, as the printing technology is the same (e.g. six offset colors of a picture); while different print phases (offset, intaglio, letter press, etc) can produce unregistrable tracks on the sheet, as the different techniques stress (and thus deform) the sheet in very different ways.

In this regard, the production of individual models and combination are well known methods. After the production of the reference model, for each phase the comparing and inspecting procedure is always the same.

BRIEF DESCRIPTION OF THE DRAWINGS

The invention will be described in more detail with the aid of the appended drawing.

In FIGS. 1 and 2, we have shown two images each composed of a square, respectively a1 and a2, and of a triangle, respectively b1 and b2. The squares a1, a2 have been printed in a first printing phase, for example intaglio printing, and the triangles in a second printing phase, for example offset printing. The relative displacement of two drawings, a2 and b2, between the two images is exaggerated in order to clarify the procedure according to the invention.

Figures 1, 2:
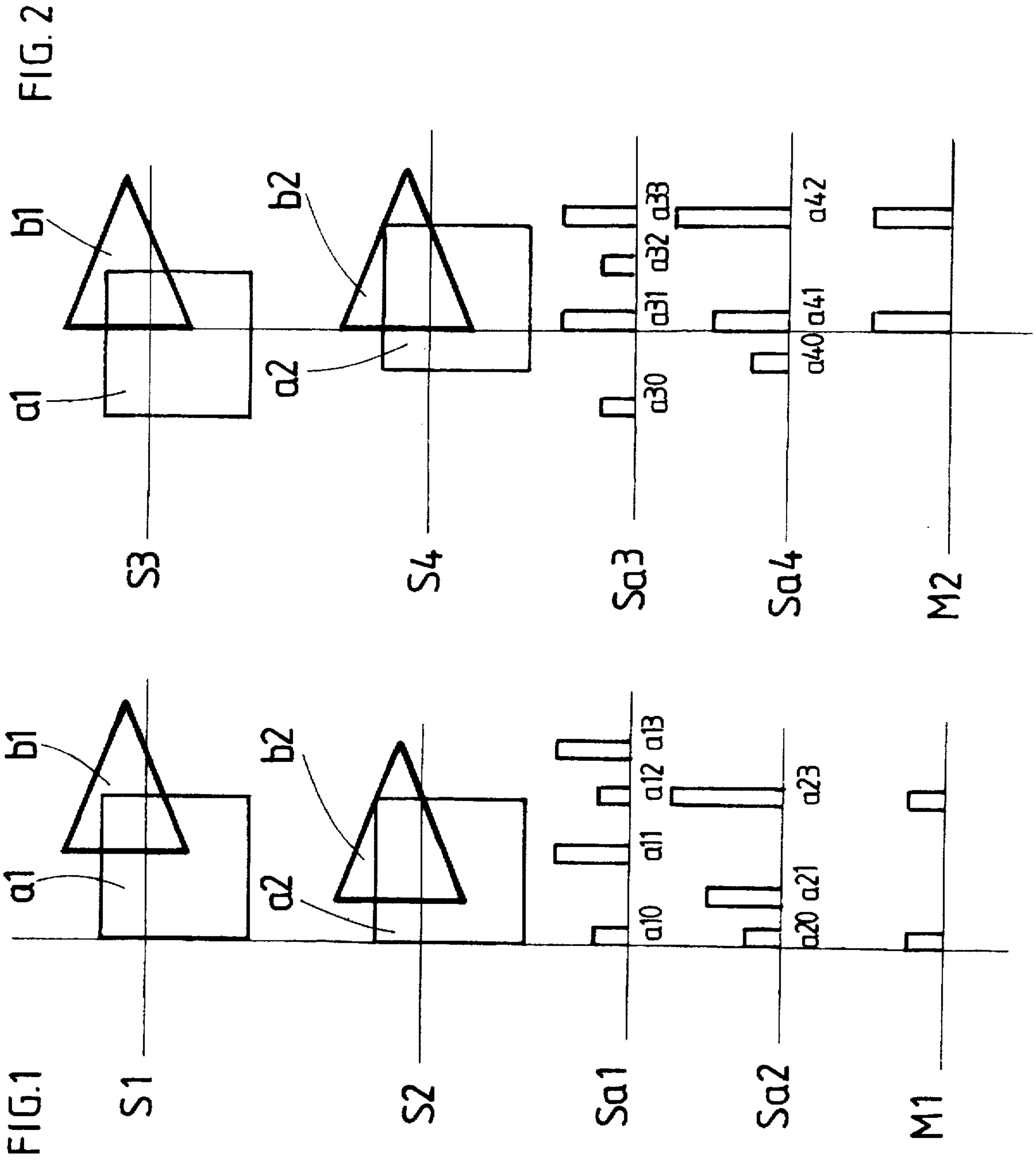
FIGS. 1 and 2 represent two images to which the procedure according to the invention is applied.

In accordance with the procedure, the two images (a1; b1) and (a2; b2) taken from the test set are aligned with respect to the drawing printed in a first printing phase, namely, in FIG. 1, the squares a1 and a2. A scan is performed along axes S1 and S2. The pixel values found on these axes are plotted in the bottom of the figure. Thus, for the image formed by the elements a1 and b1 on S1, we have the values a10 corresponding to the first pixel encountered on the square a1, the value all which corresponds to the first pixel encountered on the triangle b1 and which has a higher value because of the density of the line, the value a12 which has the same value as a10 since it is a pixel belonging to the square a1, and the value a13 which has the same value as the pixel all since it also corresponds to the triangle b1 having a line of density greater than that of the square.

Now plotting the image composed of drawings a2 and b2, and taking the same pixels on the axis S2 for the square, we obtain the values a20 corresponding to the first pixel of the square a2, the value a21 which corresponds to the first pixel of the triangle b2 and then the value a23 which is much higher than the others since it represents a superposition of a pixel belonging to the square a2 and a pixel belonging to the triangle b2. If we now choose the lowest values from among the two results plotted on Sa1 and Sa2, we obtain the model M1 composed of a first pixel which has the value a10 or a20 and of a second pixel a12 which also has the same value. It may clearly be seen that these are two pixels belonging to the square a1 when the scanning is performed along the axes S1 and S2. Obviously the complete model, which will be represented by matrices of numbers, will be obtained by making several scans of this type.

Now taking the same images in FIG. 2, but putting the triangles b1 and b 2 into register, we obtain, by likewise making S3 and S4 scans firstly for the figure composed of the elements a1 and b1, the values a30 corresponding to the first pixel encountered on the square a1. Thereafter, the value a31, which is the first pixel encountered on the triangle b1, a32, which is the pixel encountered on the square a1, and a33, which is the second pixel encountered on the triangle b1. In fact, these values are identical to those plotted in the Sa1 diagram in FIG. 1, except that they are shifted since registration is effected with respect to the triangles b1 and b2, that is to say the drawings printed by offset.

It should be similarly pointed out that, in the diagram Sa4, the values a40, a41, a42 are identical to those of Sa2 apart from the shift. Now choosing the minimum values common between Sa3 and Sa4, we obtain the model M2 composed of values a41 or a31 and the value a33, these being the minimum values and representative of the drawing of the second printing phase, namely the triangle. Here too, several scans are necessary in order to capture the entire image and produce the models M2 for the entire triangle.

It is obvious that in the present case, we have chosen only two images with two drawings in order to illustrate the way of proceeding, but in practice several printed images are used, these often being composed of several drawings and, of course, the shift between the two printing phases being less than that shown in FIGS. 1 and 2.

The images or scans are, of course, captured using suitable cameras, these being known since they are currently used for quality control.

Once the reference model of each of the phases has been obtained, a recomposition regarding the relative alignment of said phases is made. With the model thus produced, the quality is then checked using the known means. The combining of the models of each phase is a method already known to the art and used (i.e. Hieda). When a printed sheet has to be inspected, the reference models (previously produced) of each phase are aligned (put in register) with the corresponding drawings of the sheet to inspect. If the alignment of the models with the drawings of the sheet to inspect shows that the relative alignment of the models is out of a "predetermined range", the sheet is rejected without further processing. The "predetermined range" may be determined by the drawings of the test sheets. If the relative alignment (register) between the reference models is inside the predetermined range, the inspection of the pixel intensity is prosecuted. So after having "produced" a reference model of the printed sheet to inspect by "moving" the reference models of each phase until they are in register with the corresponding "drawings" of the printed sheet to inspect, and if the relative register between the reference model drawings is inside the predetermined range, the pixel intensity of the printed sheet is compared with the pixel intensity of the recombined reference model.

According to an alternative embodiment, if when producing the various models corres-ponding to drawings printed in different phases, a pixel has the same value in more than one model, this means that the pixel may be associated indiscriminately with any model, and therefore all the pixels of this type are associated with a single model and the value is set to zero in the others.

According to another embodiment of the procedure, if a pixel has different values in more than one model, these being different from zero, we associate with the model where the value is the highest the absolute value of the difference between the values of said pixel, and the value is set to zero in the model with the lower value.

If, in one or more printing phases, an opaque ink is used at the end of the procedure, the models which have not been printed with the opaque ink are recomposed, omitting from the calculations of the minimum the pixels which are also printed with the opaque ink, and, of course, the models obtained for the drawings printed with the opaque ink are kept. Here opaque ink is used in the sense of an ink fully covering any previously printed color. For instance, printing a square of blue opaque ink either on a white sheet or a preprinted one will always result in a blue square image. For this reason to build models in presence of opaque inks, the printing sequence should be kept into account.

Of course, if an image is a polychrome image, the procedure must be repeated as many times as chromatic channels used. In synthesis, the difference lies in the fact that multiple colors of the same phase can be "perfectly" registered, as the printing technology is the same (e.g. six offset colors of a picture); while different print phases (offset, intaglio, letter press, etc) can produce unregistrable tracks on the sheet, as the different techniques stress (and thus deform) the sheet in very different ways.

In this regard, the production of individual models and combination are well known methods. After the production of the reference model, for each phase the comparing and inspecting procedure is always the same.

I claim:

1. A procedure for producing a reference model, by electronic means, intended to be used for automatically checking the printing quality of an image on paper, especially for paper securities, said image being composed of drawings printed in at least two separate printing phases, which procedure comprises the following steps:

a. a set of images (test sheets), which are completely printed by means and procedures used for long print runs, is prepared;

b. said images are arranged so that the drawings of said images printed in a first phase are in register;

c. while the images remain in register said images are recorded and the densitometric values of pixels constituting said images are stored in memory;

d. the minimum value obtained from all the images of the set for each pixel location of the images of the set is associated with each pixel of a first printing phase model and the model of the drawing printed in said first printing phase is thus formed;

e. thereafter, the images are arranged so that the drawings printed in another printing phase are put into register and steps c. and d. are repeated for all the drawings printed in the separate printing phases; and f. the models thus obtained are recombined in order to form the reference model of the final produced image on paper to be checked, each individual test sheet undergoes the same type and number of printing phases as the final produced image on paper to be checked.

2. The procedure as claimed in claim 1, wherein, for a pixel having the same nonzero value in more than one model, it is assigned to a single model, setting this value to zero in the other models.

3. The procedure as claimed in claim 1, wherein, for any pixel having different nonzero values in more than one model, it is associated, in the model having the highest value, with the absolute value of the difference between the two values, and the value is set to zero in the model having the lower value.

4. The procedure as claimed in claim 1, wherein, when at least one of the drawings of the image is printed using an opaque ink at the end of step e. of the procedure, the different models of the drawing or drawings which are not printed with the opaque ink are recomposed in such a way as to exclude the pixel values printed with the opaque ink.

5. The procedure as claimed in claim 1, wherein, the image is a polychrome image, whereby the procedure is repeated as many times as the number of chromatic channels used so that for polychrome printing a model by Polychromatic channel for each phase is provided.

* * * * *